(12) United States Patent
Ganapathiappan et al.

(10) Patent No.: US 8,772,372 B2
(45) Date of Patent: Jul. 8, 2014

(54) METHOD OF MAKING A PIGMENT DISPERSION

(75) Inventors: Sivapackia Ganapathiappan, Los Altos, CA (US); Howard S. Tom, San Jose, CA (US); Hou T. Ng, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 683 days.

(21) Appl. No.: 12/572,429

(22) Filed: Oct. 2, 2009

(65) Prior Publication Data
US 2011/0082235 A1 Apr. 7, 2011

(51) Int. Cl.
*C08K 9/00* (2006.01)
*C09D 11/00* (2014.01)

(52) U.S. Cl.
USPC ........... 523/205; 523/160; 523/161; 524/555; 524/560; 524/577; 524/590

(58) Field of Classification Search
USPC .......... 523/160, 161, 205; 524/560, 555, 577, 524/590
See application file for complete search history.

(56) References Cited

U.S. PATENT DOCUMENTS

| 4,075,152 | A | 2/1978 | Taller | |
|---|---|---|---|---|
| 7,737,196 | B2* | 6/2010 | Ganapathiappan | 523/160 |
| 2008/0257212 | A1* | 10/2008 | Ganapathiappan | 106/31.75 |
| 2009/0025601 | A1* | 1/2009 | Vasudevan et al. | 106/31.65 |

FOREIGN PATENT DOCUMENTS

WO WO 2007/053564 5/2007

* cited by examiner

*Primary Examiner* — Hannah Pak

(57) ABSTRACT

A method for making a pigment dispersion can include dispersing pigment particles in an aqueous liquid medium to form a dispersion, adding a first monomer to form a dispersive coating on the pigment particles, adding a second monomer to the dispersion, and forming a polymer coating on the surface of the pigment particles by polymerizing the second monomer with the first monomer, wherein the polymer coating includes at least one urethane linkage or urea linkage.

20 Claims, No Drawings

METHOD OF MAKING A PIGMENT DISPERSION

BACKGROUND

Polymers may be used in ink-jet inks to improve image durability. When present as additives, polymers can contribute to increased viscosity due to the increased number of particles suspended in the ink. Conversely, pigments may be encapsulated in polymers, thereby providing the desired durability benefits with fewer particles per unit volume. However, a thicker coating may be required to infer sufficient durability, which can degrade printability of the pigments due to their increased size and the increased amount of polymer material. There is a desire, therefore, for methods of making polymer-encapsulated pigments and dispersions thereof that are durable while being reliably printable by ink-jet printing devices.

DETAILED DESCRIPTION

Reference will now be made to the exemplary embodiments illustrated, and specific language will be used herein to describe the same. Features and advantages of the disclosure will be apparent from the detailed description which follows, taken in conjunction with the accompanying drawings, which together illustrate, by way of example, features of the invention.

In describing and claiming the present invention, the following terminology will be used.

The singular forms "a," "an," and "the" include plural referents unless the context clearly dictates otherwise. Thus, for example, reference to "a dye" includes reference to one or more of such materials.

As used herein, "liquid vehicle" or "liquid medium" refers to the fluid in which pigments of the present disclosure are dispersed and then encapsulated to form a pigment suspension. Often, the fluid of the pigment suspension can be used as an ink-jet ink, or becomes incorporated with other solvents, surfactants, etc., to form an ink-jet ink. Many liquid vehicles and vehicle components are known in the art. Such ink vehicles may include a mixture of a variety of different agents, including without limitation, surfactants, organic solvents and co-solvents, buffers, biocides, viscosity modifiers, sequestering agents, stabilizing agents, anti-kogation agents, and water. Though not part of the liquid vehicle per se, in addition to the colorants, the liquid vehicle can carry solid additives such as polymers, latexes, UV curable materials, plasticizers, salts, etc. Additionally, the terms "aqueous liquid vehicle" or "aqueous vehicle" refer to liquid vehicles that contain water as a solvent. Such vehicles may also contain additional co-solvents as is known in the art.

As used herein, "pigment" generally includes pigment colorants, magnetic particles, aluminas, silicas, and/or other ceramics or organo-metallics, whether or not such particulates impart color. Thus, though the present description primarily exemplifies the encapsulation of pigment colorants, the term "pigment" can be used more generally to describe not only pigment colorants, but other pigments such as organometallics, ferrites, ceramics, etc. Sometimes, to provide information about the spatial relationship between the pigment and the encapsulating layers, the term "pigment core" is used, which refers to the component that is being encapsulated, and which is at the base of a polymer-encapsulated pigment.

Pigments that can be used include self-dispersed pigments and standard pigments that are dispersed by a separate dispersing agent, e.g., polymer dispersed. Self-dispersed pigments include those that have been chemically surface modified with a small molecule, a polymeric grouping, or a charge. This chemical modification aids the pigment in becoming and/or substantially remaining dispersed in a liquid vehicle. The pigment can also be dispersed by a separate additive, e.g. a polymer, an oligomer, or a surfactant, in the liquid vehicle and/or in the pigment that utilizes a physical coating to aid the pigment in becoming and/or substantially remaining dispersed in a liquid vehicle.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, the term "substantially" refers to the complete or nearly complete extent or degree of an action, characteristic, property, state, structure, item, or result. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, a plurality of components may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 0.01 to 2.0" should be interpreted to include not only the explicitly recited values of about 0.01 to about 2.0, but also include individual values and sub-ranges within the indicated range. Thus, included in this numerical range are individual values such as 0.5, 0.7, and 1.5, and sub-ranges such as from 0.5 to 1.7, 0.7 to 1.5, and from 1.0 to 1.5, etc. This same principle applies to ranges reciting only one numerical value. Furthermore, such an interpretation should apply regardless of the breadth of the range or the characteristics being described.

It has been recognized that it would be advantageous to develop encapsulated pigments suitable for use in ink-jet inks so as to provide more durable ink-jet print. Accordingly, a method for making an encapsulated pigment and dispersion thereof can comprise dispersing pigment particles in a liquid medium, coating the pigment particles with a first monomer, and then adding a second monomer selected to polymerize with the first monomer and form a polymer coating encapsulating the pigment particles.

In another embodiment, a method for making an encapsulated pigment and a dispersion thereof can comprise dispersing pigment particles in a liquid medium, coating the pigment particles with a first monomer, where the first monomer acts to disperse the pigment particles, and then adding a second monomer selected to polymerize with the first monomer and form a polymer coating encapsulating the pigment particles, where the polymer coating includes at least one urethane or urea linkage.

The formation of encapsulated pigments and dispersions thereof in accordance with the above embodiments can provide several advantages. For example, polymer encapsulation of pigments tends to reduce the number of total particles in solution (as opposed to having separate latex particulates co-dispersed with the pigments) and their combined surface areas such that the pigment suspension, e.g., ink, viscosity can be reduced. Such polymer-encapsulation also provides a particle dispersion where the particle surfaces are more uniformly charged, and are therefore more stable. Encapsulation also prevents pigment-latex separation when applied to a substrate, e.g., ink printed on a media substrate, such that durability and optical density are more optimized.

While encapsulation has been carried out with acrylic polymers, it can be advantageous to encapsulate pigments with harder polymers to increase durability. Also, the formation of thinner encapsulation layers facilitates encapsulated pigment particles that are smaller and can be jetted more reliably. Finally, encapsulation with thinner coatings that use less material can provide a more resource-efficient formulation process. Accordingly, the present embodiments provide encapsulated pigment particles having uniform thin coatings and methods for making the same using less material than typically used in acrylic encapsulation.

Urethane polymer coatings are particularly suited to address these considerations. Urethane polymers are generally harder than acrylic polymers, so that similar or greater print durability can be achieved with a smaller quantity of urethane polymer than with acrylic polymer. Furthermore, thin urethane coatings can be readily achieved with the methods disclosed herein. Therefore, for purposes of illustration, description of the present embodiments will refer primarily to exemplary embodiments directed to urethane encapsulation.

According to one embodiment, a method of making encapsulated pigment particles can comprise the step of dispersing pigment particles in an aqueous liquid medium. In one aspect the aqueous liquid medium can be water. In another aspect, the aqueous liquid medium can comprise predominantly water, but can also include smaller amounts of water-miscible co-solvents.

In a particular embodiment, the pigment used can comprise particles having a diameter of from about 20 nm to about 200 nm, and more particularly from about 50 nm to about 150 nm. Pigments having a particle size that is too small, especially lower than about 20 nm, may not provide sufficient durability. Conversely, too large a particle size can degrade jettability and can contribute to unwanted texture effects (e.g. decreased gloss) on some print surfaces. Therefore, the particle size employed can be selected based on relevant aspects of the ink or printing application in which the particle dispersion will be used, such as the ink-jet architecture or the print medium. In addition, the eventual thickness of the encapsulating layer can be taken into account when selecting pigment particle size.

The pigment can be deaggregated and dispersed in the medium using standard shear processes, such as microfluidization, sonification, or milling, in the presence of surfactant, dispersing polymer or other dispersing moiety.

A further step can comprise adding a first monomer to the pigment dispersion and where the first monomer substantially coats the pigment particles. Mixing can be employed to facilitate coating of the particles. In one aspect, a first monomer can be selected that will interact with the particle surface so that the monomer readily accumulates on the particles. In a particular embodiment, the first monomer is a hydrophobic monomer. In another aspect, the first monomer selected can include one or more acid groups to increase the stability of the dispersion.

In a particular embodiment, the first monomer can be selected to contribute to a polymer coating having urethane linkages. According to a specific embodiment, the first monomer can be a polyol. According to an alternative specific embodiment, the first monomer can be an isocyanate. Where the first monomer is a polyol, the polyol can have two hydroxyl moieties (i.e. a diol) or three or more (triols, tetrols, and so forth).

In a more particular embodiment, the first monomer can be a diol. In a general aspect, diols having the structure HO—R—OH can be used in the present embodiment, where R is an alkylene or an arylene, either of which may unsubstituted or substituted. Particular potential constituent diols include $C_2$-$C_8$ diols as well as polyglycols, including ethylene glycol, propylene glycol, polyethylene glycols, polypropylene glycols, bisphenol-A, hydroquinone, and polybutylene glycols. In a still more particular embodiment, the diol can include one or more acid groups to improve stability of the particle dispersion. One such example is 2-carboxylic-1,3-propanediol. Crosslinked or branched structures can be achieved by using polyfunctional diols.

The pigment can be dispersed in the medium with or without a surfactant. For example, commercially available aqueous dispersed pigments can be used in accordance with the present embodiments. In another approach pigment can be milled with a surfactant before adding to the aqueous medium. However, in one aspect of the present embodiments, surfactant can be omitted from the dispersion.

In this aspect the first monomer can be selected that will coat the pigment particles and, in doing so, act as a dispersant of the pigment. In one embodiment, the first monomer is a hydrophobic diol. The hydrophobic diol adsorbs onto the particle surfaces and disperses the pigment itself. In a more particular embodiment, the hydrophobic diol is the primary dispersant and the dispersion is substantially free of surfactant.

A further step in making encapsulated pigment particles comprises adding a second monomer to the dispersion, where the second monomer is selected to polymerize with the first monomer coated on the particles. As polymerization proceeds to completion, a polymer coating is formed on the surface of the particles until the particles are encapsulated in the polymer. The second monomer can be selected so that polymerization will yield a particular polymer coating. For example, where the polymer coating includes a urethane linkage, the second monomer can be chosen so as to produce such linkages with the first monomer.

In embodiments where the first monomer is a polyol, the second monomer can be a polyisocyanate. In a more particular aspect, the second monomer can be a molecule having at least two isocyanate moieties, such as a diisocyanate. Some examples of diisocyanates that may be used include isophorone diisocyanate, tolylene-2-4-diisocyanate, hexamethylene diisocyanate, napthalene diisocyanate, 2,4-toluene diisocyanate, 2,6-toluene diisocyanate, methylene diphenyl-4,4'-diisocyanate, 1,4-tetramethylene diisocyanate, and biphenyl diisocyanate. Crosslinked or branched structures can be achieved by using polyfunctional isocyanates.

In an alternative embodiment, the constituent monomers can be selected to contribute to a polymer coating having at least one urea linkage. According to a specific embodiment, the first monomer can be a polyamine, or more particularly a diamine, and the second monomer can be an isocyanate. According to an alternative specific embodiment, the first monomer can be an isocyanate, and the second monomer can be a polyamine.

The second monomer can be added directly to the dispersion of particles coated with the first monomer. Alternatively, the second monomer can be added using a suitable water soluble solvent. Suitable solvents can include, but are not limited to, N,N-dimethylformamide, N,N-dimethylacetamide, N,N,N',N'-tetramethylurea, N-methylpyrrolidone, N-methylformamide, 2-pyrrolidone, tetramethylene sulfone, dimethylsulfoxide, and tetrahydrofuran.

In accordance with the present embodiment, an advantage can be realized in that the polymerization of the monomers can go to completion. This stands in contrast to the incomplete polymerization that often occurs with acrylic polymers in pigment dispersions. In such cases, the pigment can act as an anti-oxidant and quench the free radicals involved in polymerization, resulting in a premature arrest to the polymerization process. In one aspect, the first monomer and second monomer are provided in a ratio such that substantially all of the first monomer coated on the pigment polymerizes with the second monomer. For example, where the two monomers comprise a diol and a diisocyanate, the two monomers can be added in amounts that provide a 1:1 molar ratio. In a specific embodiment, the pigment, first monomer, and second monomer can be present in the dispersion at a weight percentage ratio in which about 1.0 part pigment is included with about 0.1 to about 5.0 parts first monomer, and from about 0.1 to about 5.0 parts second monomer. In a more specific embodiment, the weight percentage ratio of pigment, first monomer, and second monomer is about 1.0:1.5:0.5.

The encapsulated pigment particles of the present embodiments provide enhanced durability with a thinner polymer coating. In one aspect, the urethane encapsulated pigment particles of the present embodiment exhibit similar or greater durability but with a thinner polymer coating as compared to particles encapsulated in acrylic polymer. The thinner urethane coating provides the benefit of increased durability while minimizing the impact of the coating on particle diameter. As such, the particles of the present embodiments can be included in an ink-jettable dispersion to impart high durability without affecting printability. In a particular aspect, the polymer coating is from about 5 nm to about 100 nm.

As mentioned, a pigment suspension can comprise an aqueous liquid vehicle in which are dispersed encapsulated pigment particles according to the methods described above. In a more specific embodiment, where the pigment is a pigment colorant, the pigment dispersion is an ink-jet ink. Alternatively, the pigment dispersion or ink-jet ink can comprise polymer-encapsulated pigment particles made according to the methods of the present disclosure. In accordance with embodiments of the present disclosure, the polymer-encapsulated pigments of the present disclosure can be present in a pigment dispersion at from 1 wt % to 30 wt %. If the pigment dispersion is an ink-jet ink, the polymer-encapsulated pigments of the present disclosure can be present in an ink-jet ink at from 1 wt % to 10 wt %.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this disclosure may range from 0 wt % to 5.0 wt %. It is to be noted that the surfactant that is described as being usable in the liquid vehicle need not be adhered to the surface of the latex particulate, though many of the same surfactants can be used for either purpose. In fact, as described above, a particular aspect of the present embodiment is that the pigment particles can be dispersed in the initial dispersion by the first monomer alone.

Consistent with the formulation of this disclosure, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2.0 wt %, for example, can be used. Viscosity modifiers and buffers may also be present, as well as other additives known to those skilled in the art to modify properties of the ink as desired. Such additives can be present at from 0 wt % to 20.0 wt %.

EXAMPLES

Example 1

Making a Pigment Dispersion

Carbon black pigment particles (175 g; Printex 25™, Degussa Corp.) are mixed with Lutensol AT 50™ (17.5 g) and water (1900 ml). The mixture is stirred well for three days at ambient temperature, then microfluidized for three passes at 90 psi, followed by two passes at 10 psi to obtain a pigment dispersion in which the pigment concentration was 8.44 wt %.

Example 2

Encapsulation of Pigment with Polyurea

The dispersion from Example 1 (118.4 g) is stirred vigorously. Then isophoronediisocyanate (10 g) is added dropwise. After three minutes, ethylenediamine (1.35 g in 10 ml water) is added dropwise and the dispersion is stirred at ambient temperature for 17 h. The dispersion is filtered with 200 mesh filter to recover the encapsulated particles. Waterfastness of these encapsulated particles is observed to be better than that of the pigment dispersion itself.

Example 3

Encapsulation of Pigment with Polyurethane Using First Monomer as Dispersant

Carbon black pigment particles (2.5 g; Printex 25™, Degussa Corp.) are mixed with 1,8-octanediol (2.5 g) and bis(hydroxymethyl)butyric acid (0.51 g) and heated to 75° C.

to make a homogeneous mixture. It is cooled and dispersed by milling with water (22 ml) using zirconia beads (20 g) to obtain a dispersion. Optionally, surfactants such as sodium dodecyl sulfate or Lutensol AT 50™ (0.25 g) are added to control the particle size. The beads are removed and the mixture is again heated to 75° C. Then isophoronediisocyanate (1.0 g) is added dropwise to facilitate the reaction of alcohol with isocyanate. It is stirred vigorously for 17 h. The solution is cooled and the pH of the solution is adjusted to 8.5 with 20% potassium hydroxide solution to obtain stable encapsulated pigment dispersion.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the invention be limited, except as by the claims set forth below.

What is claimed is:

1. A method for making an encapsulated pigment dispersion, comprising:
    dispersing pigment particles in an aqueous liquid medium to form a dispersion;
    adding a first monomer to the dispersion, wherein the first monomer forms a dispersive coating on the pigment particles;
    adding a second monomer to the dispersion after formation of the dispersive coating, the adding of the second monomer to the dispersion beginning polymerization in the dispersion of the second monomer with the first monomer; and
    forming a polymer coating on the surface of the pigment particles by polymerizing the second monomer with the first monomer in the dispersive coating, thereby creating encapsulated pigment particles;
    wherein the polymer coating includes at least one urethane linkage or urea linkage.

2. The method of claim 1, wherein the polymer coating includes the urethane linkage and not the urea linkage.

3. The method of claim 1, wherein the polymer coating includes the urea linkage and not the urethane linkage.

4. The method of claim 1, wherein the polymer coating includes the urethane linkage and the urea linkage.

5. The method of claim 1, wherein the first monomer is a hydrophobic polyol.

6. The method of claim 5, wherein the second monomer is a polyisocyanate, resulting in the urethane linkage.

7. The method of claim 5, wherein the hydrophobic polyol is a diol.

8. The method of claim 5, wherein the hydrophobic polyol includes at least one acid group.

9. The method of claim 5, wherein the second monomer is a diisocyanate.

10. The method of claim 1, wherein the first monomer is a polyisocyanate.

11. The method of claim 10, wherein the second monomer is a polyol, resulting in the urethane linkage.

12. The method of claim 10, wherein the hydrophobic polyol includes at least one acid group.

13. The method of claim 10, wherein the second monomer is a polyamine, resulting in the urea linkage.

14. The method of claim 1, wherein the first monomer is sufficient to disperse the pigment particles in the aqueous liquid medium with no surfactants present in the aqueous liquid medium.

15. The method of claim 1, wherein the pigment particles, first monomer, and second monomer are present in the aqueous liquid medium at a weight percentage ratio in which about 1.0 part pigment is included with about 0.1 to about 5.0 parts first monomer, and from 0.1 to about 5.0 parts second monomer.

16. The method of claim 15, wherein the pigment particles, first monomer, and second monomer are present in the aqueous liquid medium at weight percentage ratio of about 1.0: 0.5:5.0.

17. A precursor to an encapsulated pigment dispersion, comprising:
    an aqueous liquid medium;
    pigment particles dispersed in the aqueous liquid medium, wherein the pigment particles are coated with a first monomer and are dispersed by the first monomer; and
    a second monomer added to the aqueous liquid medium and to be polymerized with the first monomer previously coated on the pigment particles to produce a polymer coating encapsulating the pigment particles and including at least one urethane linkage;
    wherein the pigment particles, the first monomer and the second monomer are present in a weight percentage ratio of 1.0:1.5:0.5.

18. The precursor to the pigment dispersion of claim 17, wherein the precursor is substantially free of surfactant.

19. The precursor to the pigment dispersion of claim 17, wherein the first monomer is a hydrophobic polyol, and the second monomer is a polyisocyanate.

20. An ink-jet ink comprising the pigment dispersion formed from the precursor of claim 17.

* * * * *

UNITED STATES PATENT AND TRADEMARK OFFICE
CERTIFICATE OF CORRECTION

PATENT NO. : 8,772,372 B2  
APPLICATION NO. : 12/572429  
DATED : July 8, 2014  
INVENTOR(S) : Sivapackia Ganapathiappan et al.

Page 1 of 1

It is certified that error appears in the above-identified patent and that said Letters Patent is hereby corrected as shown below:

In the Claims

In column 8, line 22, in Claim 15, before "0.1" insert -- about --.

In column 8, line 26, in Claim 16, after "medium at" insert -- a --.

Signed and Sealed this  
Fourth Day of November, 2014

Michelle K. Lee  
*Deputy Director of the United States Patent and Trademark Office*